United States Patent
Ejima

(10) Patent No.: US 9,125,238 B2
(45) Date of Patent: Sep. 1, 2015

(54) WIRELESS COMMUNICATION DEVICE, WIRELESS COMMUNICATION METHOD

(75) Inventor: Takeshi Ejima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 347 days.

(21) Appl. No.: 13/569,825

(22) Filed: Aug. 8, 2012

(65) Prior Publication Data

US 2013/0039358 A1 Feb. 14, 2013

(30) Foreign Application Priority Data

Aug. 10, 2011 (JP) ................................ 2011-175416

(51) Int. Cl.
*H04W 84/20* (2009.01)

(52) U.S. Cl.
CPC ..................................... *H04W 84/20* (2013.01)

(58) Field of Classification Search
USPC ...................... 370/255, 338; 455/41.2, 67.11; 709/204, 205, 227, 229, 244
See application file for complete search history.

(56) References Cited

U.S. PATENT DOCUMENTS

| | | | |
|---|---|---|---|
| 2005/0262216 A1 | 11/2005 | Kashiwabara et al. | |
| 2007/0297611 A1 | 12/2007 | Yun et al. | |
| 2010/0284450 A1 | 11/2010 | Ejima | |
| 2011/0004920 A1 | 1/2011 | Ejima | |
| 2011/0093536 A1* | 4/2011 | Wentink | 709/204 |
| 2011/0130097 A1 | 6/2011 | Ejima | |
| 2012/0278389 A1* | 11/2012 | Thangadorai | 709/204 |

FOREIGN PATENT DOCUMENTS

| | | |
|---|---|---|
| JP | 2004-364179 | 12/2004 |
| JP | 2006-526932 A | 11/2006 |
| JP | 2008-511240 A | 4/2008 |
| JP | 2009-005011 | 1/2009 |
| JP | 2009-239513 | 10/2009 |
| JP | 2010-215399 | 9/2010 |

OTHER PUBLICATIONS

Wi-Fi Alliance Technical Committee P2P Task Group, 2010, Wi-Fi Alliance, Version 1.1, pp. 1-159.*

(Continued)

*Primary Examiner* — Michael Thier
*Assistant Examiner* — Prince A Mensah
(74) *Attorney, Agent, or Firm* — Harness, Dickey & Pierce, P.L.C.

(57) ABSTRACT

A wireless communication device constitutes a wireless network which includes plural wireless communication devices and which is for performing communications between the plural wireless communication devices. The wireless communication device has a base station index based on which the wireless communication device functions as a base station of the wireless network. The base station index expresses a degree to which the wireless communication device functions as the base station. The wireless communication device includes a base station transfer unit configured to perform a transfer process of transferring a function of the base station of the wireless network from a first wireless communication device functioning as the base station of the wireless network already formed to a second wireless communication device that is newly joining the wireless network, when the base station index of the second wireless communication device is higher than that of the first wireless communication device.

8 Claims, 9 Drawing Sheets

(56) References Cited

OTHER PUBLICATIONS

"Part 11: Wireless LAN Medium Access Control (MAC) and Physical Layer (PHY) Specifications", IEEE Standard for information Technology, IEEE Std 802.11 Specification, 7.3.2.28 BSS Load element, p. 129 (2007).

Japanese Office Action dated Jun. 16, 2015 issued in corresponding Japanese Application No. JP2011-175416.

* cited by examiner

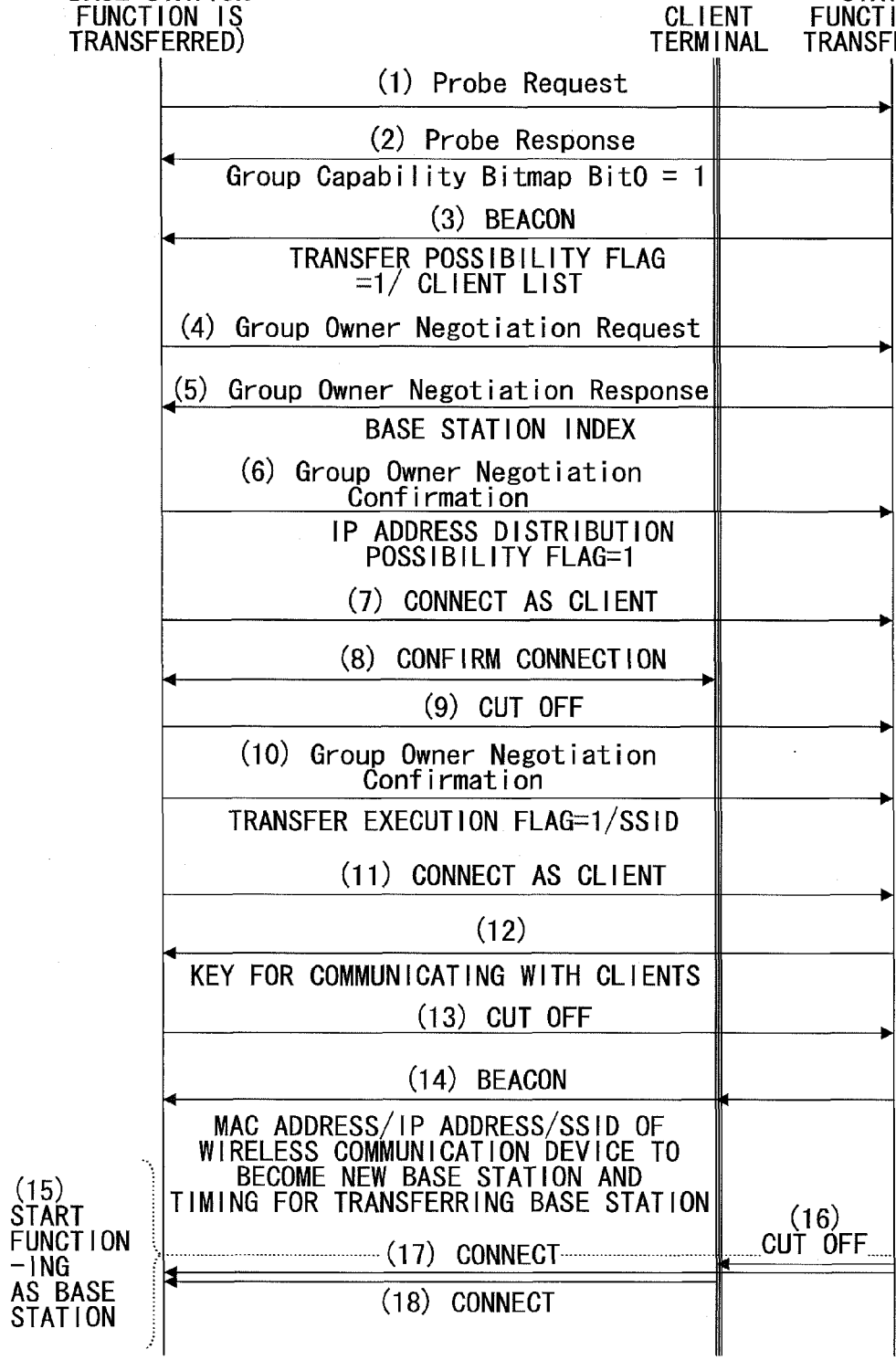

WIRELESS COMMUNICATION DEVICE, WIRELESS COMMUNICATION METHOD

BACKGROUND OF THE INVENTION

1. Field of the Invention

The present invention relates to a wireless communication device and a wireless communication method. More particularly, the present invention relates to a wireless communication device constituting a wireless network for performing communications between wireless communication devices, and to a wireless communication device that can transfer a function of a first wireless communication device functioning as a base station in a wireless network that is already formed, to a second wireless communication device to be newly added.

2. Description of the Related Art

Wireless LAN technologies such as 802.11a, 802.11g, and 802.11n prescribed by the IEEE (The Institute of Electrical and Electronic Engineers) 802.11 task group for developing standards for wireless LAN, are becoming widespread in homes and offices all over the world.

As to the specification of 802.11a/11g/11n, there are two connection formats, i.e., an infrastructure mode using a base station and an ad-hoc mode.

In the infrastructure mode, there are stations that are wireless LAN terminals centering around a base station, and data transmission between one station and another station is performed via the base station. The infrastructure mode is widely applied to environments such as offices and homes. The infrastructure mode is a connection format that is more widespread than the ad-hoc mode that is limited in terms of data transmission speed and security.

Meanwhile, according to technology trends in recent years, there are increasing types of communication devices in which a wireless LAN communication function is installed, i.e., Wi-Fi enabled devices, such as personal computers, mobile phones, digital cameras, keyboards, and headphones. Thus, there is an increased need for transmitting data between various communication devices without using a base station.

Wi-Fi Alliance, which is a business organization for promoting wireless LAN products, announced a draft specification "Wi-Fi CERTIFIED Wi-Fi Direct" for directly communicating between Wi-Fi terminals, in October 2009. Subsequently, an official specification Wi-Fi Peer-to-Peer (P2P) Technical Specification Version 1.15 (hereinafter, "Wi-Fi Direct specification") was announced in October 2010.

The Wi-Fi Direct specification inherits the conventional infrastructure mode, which is a format where wireless communication devices are present in a wireless network formed by a base station, and data transmission is performed between the base station and the terminals, or data transmission between terminals is relayed by the base station. However, an entity of a base station is not provided. One of the terminals in the network serves as a base station and becomes a P2P Group Owner (hereinafter, "group owner"), and the terminals in the network other than the group owner become P2P Clients (hereinafter, "client"). Data transmission is performed between the group owner and the client, or data transmission between clients is relayed by the group owner.

The respective wireless communication devices in a network as Wi-Fi Direct enabled devices are likely to become a group owner, and thus need to include functions of a base station. Functions of a base station are typically installed in a wireless communication device by software.

The method of determining the communication device to operate as a group owner is defined as Group Owner Negotiation (hereinafter, "negotiation") in the Wi-Fi Direct specification. Specifically, by comparing the values set in the respective wireless communication devices corresponding to Group Owner Intent (hereinafter, "GOI" or generally referred to as a "base station index") (0 through 15) expressing the degree of the intension to operate as a group owner, the wireless communication device having a large value, i.e., the wireless communication device strongly intending to operate as a group owner, is determined to be the group owner.

For example, as illustrated in FIG. 1, there are two Wi-Fi Direct enabled devices, a wireless communication device 101 and a wireless communication device 102. When the value of the GOI (Group Owner Intent) of the wireless communication device 101 is "8" and the value of the GOI of the wireless communication device 102 is "5", the wireless communication device 101 having the higher value operates as the group owner.

As described above, in the Wi-Fi Direct specification, two wireless communication devices report their respective base station indices to each other, and the device having the larger value becomes the group owner, and executes functions of a base station in a conventional wireless LAN.

When a new wireless communication device is to join a P2P group (hereinafter, "group") where a group owner and clients are already present, negotiation is not executed, and the new device sends a connection request as a client to the group owner.

Assuming that in the example of FIG. 1, the GOI value of the wireless communication device 101 is "1" and the GOI value of the wireless communication device 102 is "0", and as a result the wireless communication device 101 is the group owner. In this case, even if a wireless communication device 103 that is newly joining has the maximum GOI value of "15", the wireless communication device 101 having a GOI value "1" continues to operate as the group owner.

The GOI value is determined in consideration of aspects such as the processing capability of the hardware and whether there is an interface for connecting the group with a wireless LAN network (concurrent connection).

It is preferable that the wireless communication device having the highest GOI operates as the group owner.

In the Wi-Fi Direct specification, it is possible for a wireless communication device that is newly joining the group, having a high GOI than the others, to perform negotiation with the wireless communication devices in a network that is already formed, and to become the new group owner. However, as shown in FIG. 2, assuming that an existing client 202 is present, and the group owner is switched from a wireless communication device 201 to a wireless communication device 203, the communication of the existing client 202 is cut off.

A technology of continuing communication even if the device serving as the base station is changed to another device as viewed from the client, is described as a roaming technology in Wireless LAN Medium Access Control (MAC) and Physical Layer (PHY) Specifications 802.11-2007 (hereinafter, "IEEE 802.11 specification") issued by IEEE. Roaming is a technology for setting a SSID (Service Set Identifier) in advance in plural base stations as a common network ID. When a wireless communication device becomes distant from a base station to which it has been initially connected, and the wireless communication device can no longer detect the base station, the wireless communication device searches for another base station having the same SSID, and when such a base station is found, the wireless communication device connects with the found base station.

As to the roaming technology, patent document 1 describes a mapping table storage unit for storing connection information used for connecting to a base station of a public wireless LAN that is a roaming destination and a mapping table used for generating Web authentication information, and a roaming connection information generating unit for referring to the mapping table and generating connection information and Web authentication information of the base station of the public wireless LAN that is the roaming destination, based on connection information and Web authentication information of a base station of the public wireless LAN specified by the user. Accordingly, the connection information and the Web authentication information of a base station for receiving a roaming service are easily set.

Furthermore, patent document 2 describes that in a storage unit of a wireless LAN terminal, plural MAC addresses corresponding to wireless base stations to which the wireless LAN terminal can be connected are stored in advance. When roaming to a different base station, a communication control unit selects an arbitrary MAC address read from the storage unit, and a wireless communication unit performs an authentication process and a registration process with the wireless base station of the MAC address selected by the communication control unit. Accordingly, the time required for the roaming operation is reduced.

Patent Document 1: Japanese Laid-Open Patent Publication No. 2009-005011

Patent Document 2: Japanese Laid-Open Patent Publication No. 2009-239513

In both documents 1 and 2, it is assumed that the same SSID is set in plural base stations in advance. Furthermore, it is assumed that when the wireless LAN terminal can no longer detect the base station to which it has been connected, the wireless LAN terminal switches to another base station. Therefore, these technologies do not compare the base station indices expressing the degree to which each wireless communication device may function as a base station, and do not consider transferring to a base station having a higher base station index.

SUMMARY OF THE INVENTION

The present invention provides a wireless communication device and a wireless communication method, in which one or more of the above-described disadvantages are eliminated.

According to an aspect of the present invention, there is provided a wireless communication device constituting a wireless network which is constituted by plural wireless communication devices and which is for performing communications between the plural wireless communication devices in the wireless network, the wireless communication device having a base station index based on which the wireless communication device functions as a base station of the wireless network, the base station index expressing a degree to which the wireless communication device functions as the base station, the wireless communication device including a base station transfer unit configured to perform a transfer process of transferring a function of the base station of the wireless network from a first wireless communication device functioning as the base station of the wireless network already formed to a second wireless communication device that is newly joining the wireless network, when the base station index of the second wireless communication device is higher than that of the first wireless communication device.

According to an aspect of the present invention, there is provided a non-transitory computer-readable recording medium storing a wireless communication program in a wireless communication device constituting a wireless network which is constituted by plural wireless communication devices and which is for performing communications between the plural wireless communication devices in the wireless network, the wireless communication device having a base station index based on which the wireless communication device functions as a base station of the wireless network, the base station index expressing a degree to which the wireless communication device functions as the base station, wherein the wireless communication program causes a computer to execute a method including a base station transfer step of performing a transfer process of transferring a function of the base station of the wireless network from a first wireless communication device functioning as the base station of the wireless network already formed to a second wireless communication device that is newly joining the wireless network, when the base station index of the second wireless communication device is higher than that of the first wireless communication device.

According to an aspect of the present invention, there is provided a wireless communication method executed by a wireless communication device constituting a wireless network which is constituted by plural wireless communication devices and which is for performing communications between the plural wireless communication devices in the wireless network, the wireless communication device having a base station index based on which the wireless communication device functions as a base station of the wireless network, the base station index expressing a degree to which the wireless communication device functions as the base station, the wireless communication method including a base station transfer step of performing a transfer process of transferring a function of the base station of the wireless network from a first wireless communication device functioning as the base station of the wireless network already formed to a second wireless communication device that is newly joining the wireless network, when the base station index of the second wireless communication device is higher than that of the first wireless communication device.

BRIEF DESCRIPTION OF THE DRAWINGS

Other objects, features and advantages of the present invention will become more apparent from the following detailed description when read in conjunction with the accompanying drawings, in which:

FIG. 8 is a sequence diagram indicating the flow of operations of the wireless communication device according to an embodiment of the present invention.

DETAILED DESCRIPTION OF THE PREFERRED EMBODIMENTS

A description is given, with reference to the accompanying drawings, of embodiments of the present invention.

Overview

Figure 3:
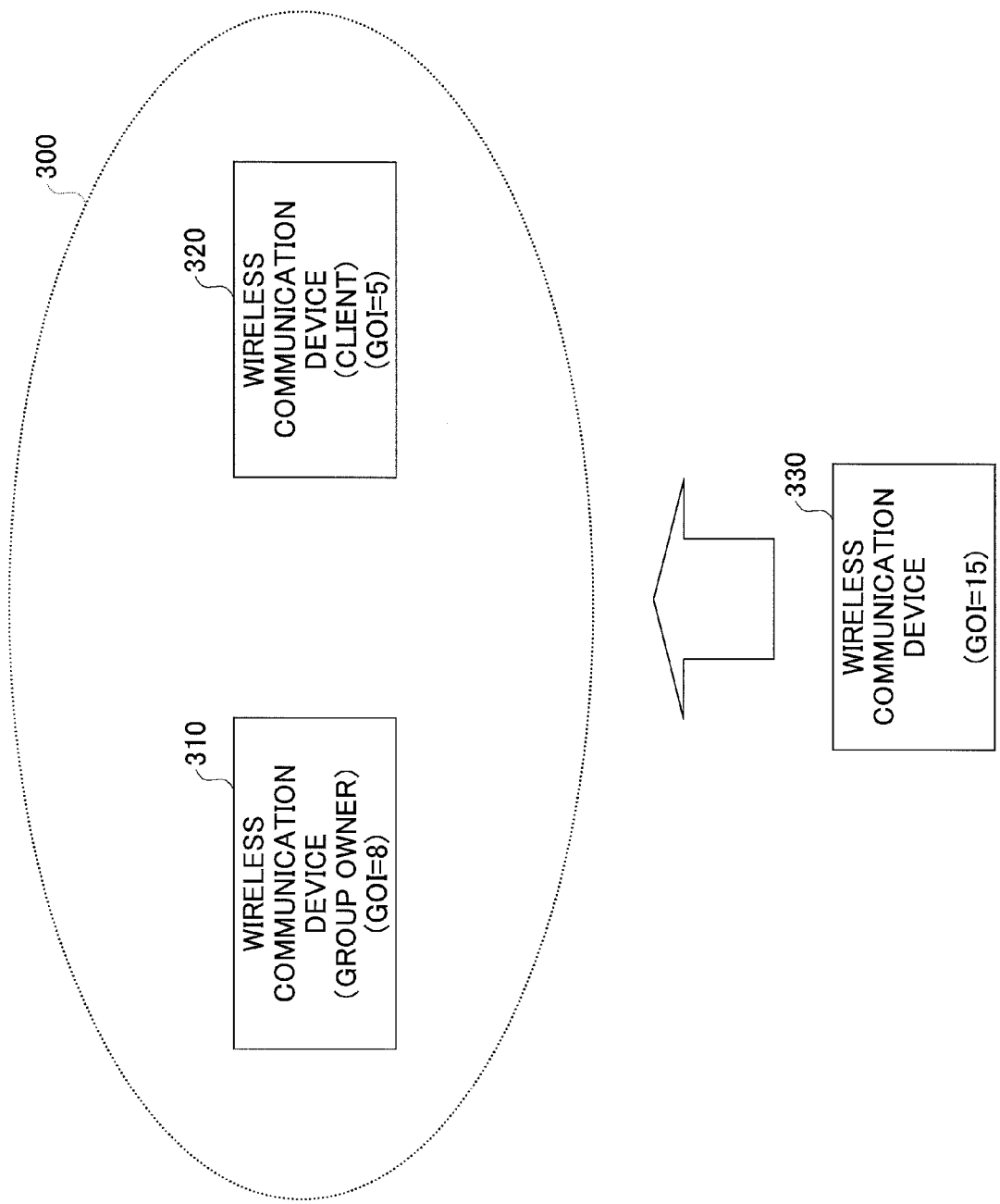
FIG. 3 illustrates an overview of a network to which a wireless communication device according to an embodiment of the present invention belongs.

FIG. 3 illustrates an overview of a network to which a wireless communication device according to an embodiment of the present invention belongs.

A wireless network 300 includes a wireless communication device 310 functioning as a base station and a wireless communication device 320 functioning as a client. A wireless communication device 330 having a higher base station index than the other wireless communication devices newly joins the wireless network 300, and can receive the transfer of functions of the base station from the wireless communication device 310.

The wireless communication device 310 and the wireless communication device 320 negotiate with each other in advance based on their respective base station indices, and determine which one of them is to function as a base station. In this example, the base station index of the wireless communication device 310 is "8", and the base station index of the wireless communication device 320 is "5", and therefore the wireless communication device 310 functions as the base station.

According to an embodiment of the present invention, the wireless communication device 330 having a base station index of "15" can take over the functions of a base station from the wireless communication device 310 that is the base station of the existing wireless network 300. Furthermore, the transfer of the base station can be performed without the wireless communication device 320 losing sight of the base station.

In the existing wireless network 300, only one client is shown; however, there are actually more clients connected to the wireless network 300. In an embodiment of the present invention, is this case also, the group owner is transferred without the clients losing sight of the base station.

Example of Hardware Configuration

Figure 4:
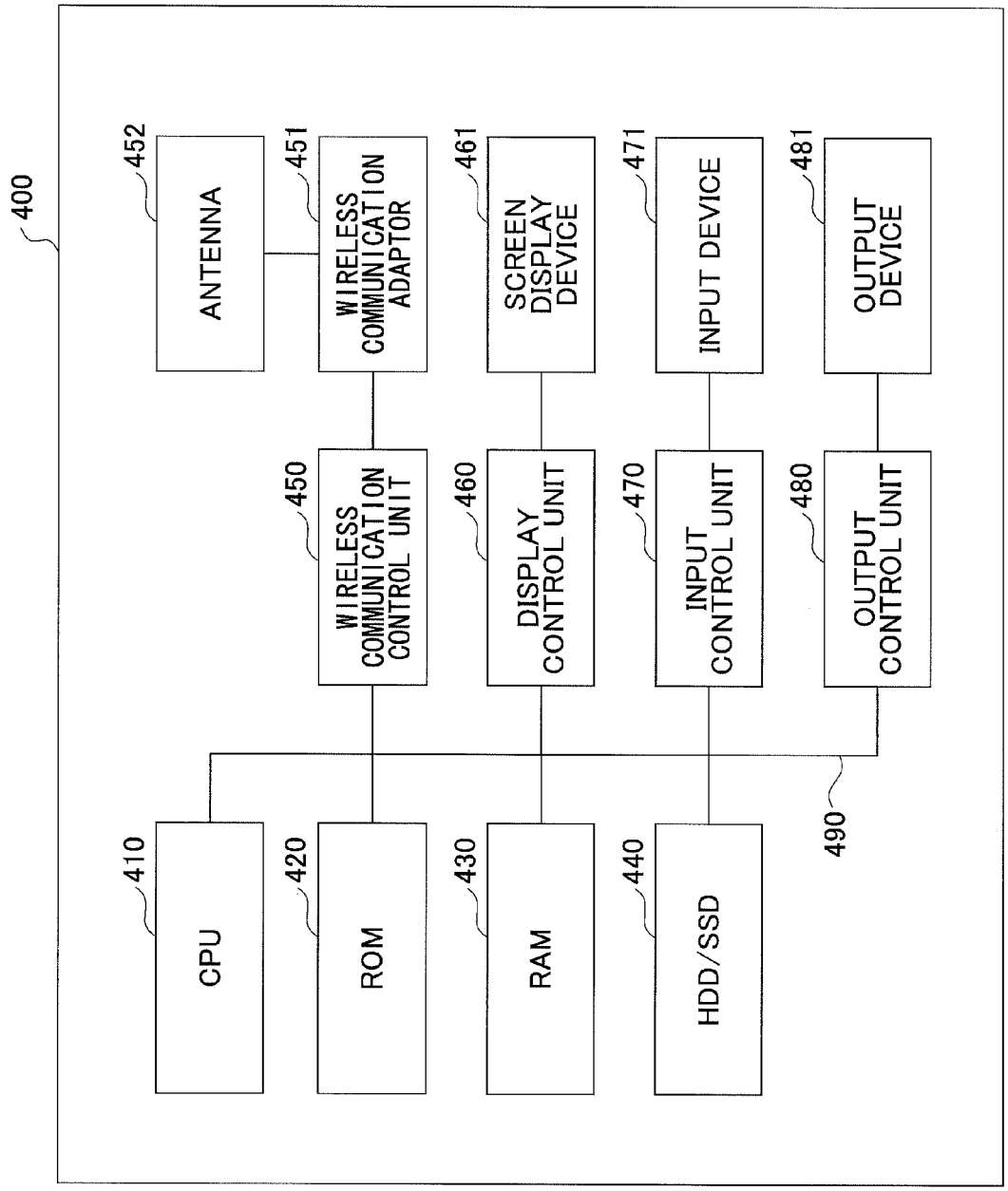
FIG. 4 illustrates an example of a configuration of a wireless communication device according to an embodiment of the present invention.

FIG. 4 illustrates an example of a configuration of a wireless communication device 400 according to an embodiment of the present invention. The wireless communication device 400 includes a CPU 410, a ROM 420, a RAM 430, a HDD/SSD (Solid State Drive) 440, a wireless communication control unit 450, a wireless communication adaptor 451, an antenna 452, a display control unit 460, a screen display device 461, an input control unit 470, an input device 471, an output control unit 480, an output device 481, and a bus 490. The wireless communication device 400 can operate as a base station or a client of a wireless network, and can receive the transfer of base station functions.

The CPU 410 controls the operation of the wireless communication device 400 and a wireless communication program according to an embodiment of the present invention. The ROM 420 stores the wireless communication program executed by the CPU 410, an activation program, and necessary data. The RAM 430 serves as a work area of the CPU 410. The HDD/SSD 440 is used for storing a driver for driving the above-mentioned program, necessary data, and other devices.

The wireless communication control unit 450 executes a communication control process according to various protocols for performing wireless communications with other wireless communication devices via the wireless communication adaptor 451 having the antenna 452. Examples of protocols are the IEEE 802.11 specification and the Wi-Fi Direct specification. Examples of the wireless communication adaptor 451 are those that comply with the IEEE 802.11 specification or the Wi-Fi Direct specification.

The display control unit 460 controls the contents displayed on the screen display device 461 according to the process contents in the wireless communication device 400. The input control unit 470 processes signals from the input device 471 for receiving input from the user. Examples of the input device 471 are a keyboard, a mouse, a touch panel, buttons and dials.

The output control unit 480 controls output signals to the output device 481. An example of the output device 481 is a printer.

The bus 490 connects the above elements to each other so that data may be exchanged.

According to the above configuration, the wireless communication device according to an embodiment of the present invention performs wireless communications to transfer functions of a base station of an existing wireless network from one of the wireless communication devices among plural wireless communication devices constituting the wireless network to a wireless communication device that is newly joining the wireless network and that is more appropriate as a base station than others.

The wireless communication program may be stored in the HDD/SSD 440.

Furthermore, the present embodiment may be implemented without the screen display device 461 or the output device 481.

As a wireless communication protocol with which the wireless communication control unit 450 and the wireless communication adaptor 451 comply, other wireless communication standards such as Bluetooth, ZigBee, and IrDA DATA may be used. Accordingly, it is possible to form a network for accommodating even more wireless communication devices.

Description of Functional Blocks

Figure 5:
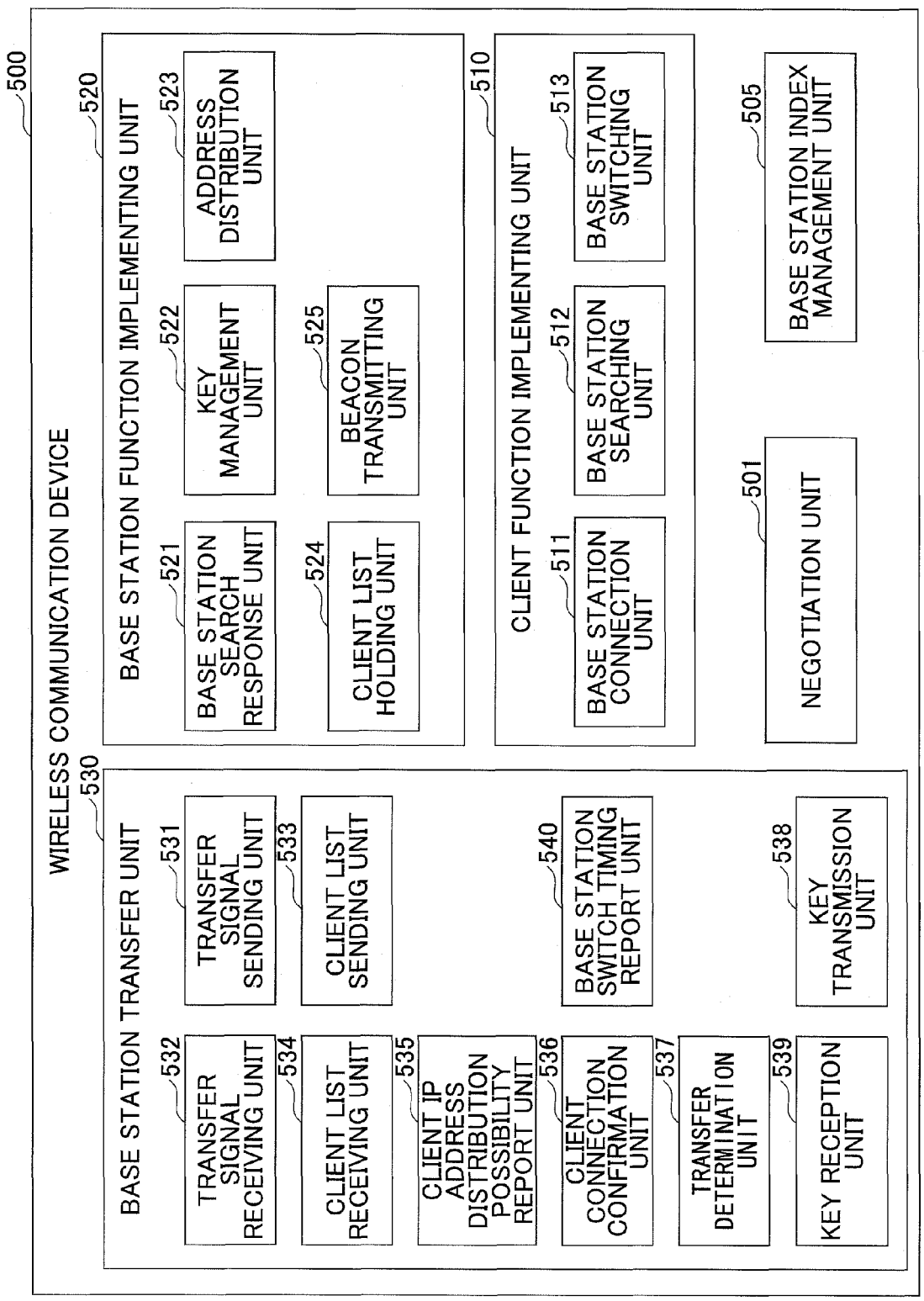
FIG. 5 is a functional block diagram expressing functions of the wireless communication device according to an embodiment of the present invention.

FIG. 5 is a functional block diagram expressing functions of the wireless communication device according to an embodiment of the present invention.

A wireless communication device 500 includes a negotiation unit 501 for negotiating with another wireless communication device to determine whether to become a base station, a base station index management unit 505 for managing base station indices, a client function implementing unit 510 for implementing functions as a client with respect to a base station, a base station function implementing unit 520 for functioning as a base station, and a base station transfer unit 530 for transferring functions of a base station to a wireless communication device newly joining the wireless network. The wireless communication device 500 can function as a base station or a client, and can receive transfer of functions of an existing base station.

Figure 1:
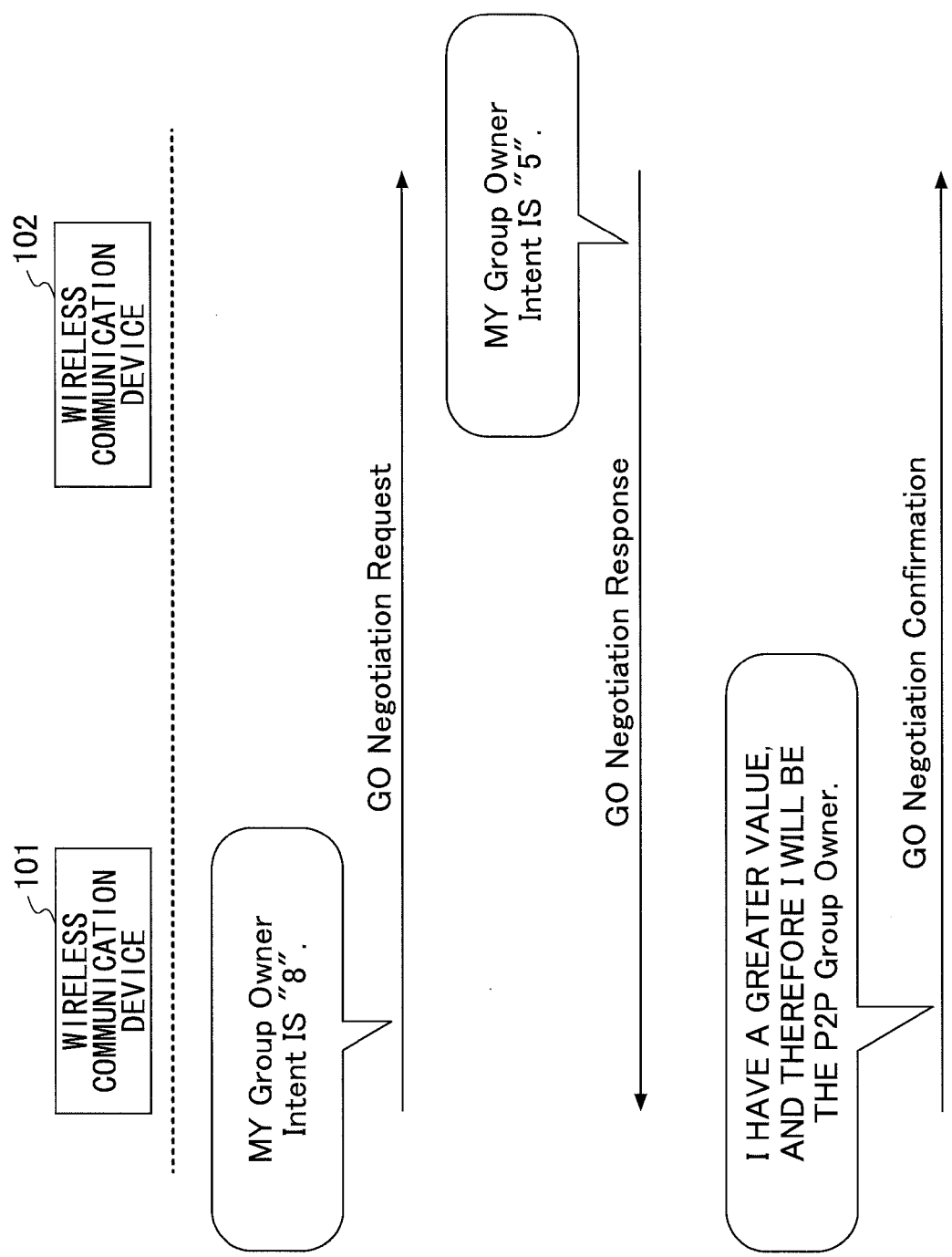
FIG. 1 illustrates a flow of a Group Owner Negotiation in compliance with the existing Wi-Fi Direct specification.
Figure 2:
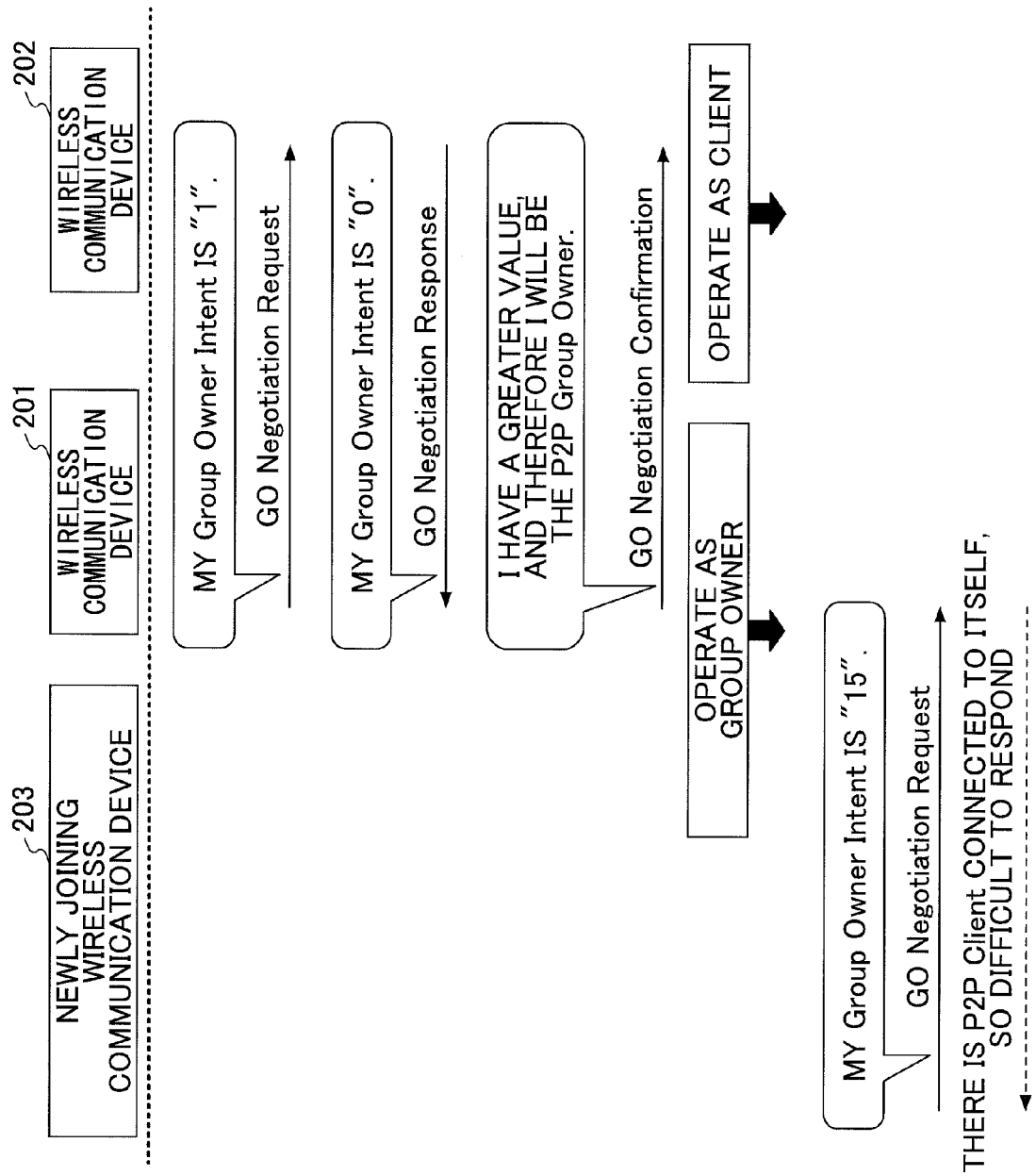
FIG. 2 indicates problems that arise when a newly joining wireless communication device takes over the functions of a group owner in compliance with the existing Wi-Fi Direct specification.

The negotiation unit 501 performs negotiation to determine the wireless communication device to function as a base station, when the wireless communication device 500 constitutes a wireless network with other wireless communication devices. Specifically, as shown in FIG. 1, the wireless communication device 101 starting negotiation makes a negotiation request and reports a base station index managed by the base station index management unit 505. Next, the wireless communication device 101 receives, from the wireless communication device 102 that is the communication correspondent, the base station index of the wireless communication device 102 as a response. Accordingly, the wireless communication device 101 having a larger base station index functions as a base station. As shown in FIG. 1, the negotiation is performed according to the Wi-Fi Direct specification.

The base station index management unit 505 manages base station indices determined by a hardware specification of the wireless communication device 500 or by a user's setting. This value is used by the negotiation unit 501 for determining the wireless communication device functioning as the base station.

The client function implementing unit 510 includes a base station connection unit 511, a base station searching unit 512, and a base station switching unit 513. The client function implementing unit 510 provides a function for connecting, as a client, to a wireless communication device providing functions of a base station.

The base station connection unit 511 connects to a wireless communication device functioning as a base station, when it is determined that the wireless communication device 500 is to function as a client as a result of negotiations performed by the negotiation unit 501. When the connection is completed, a wireless network is formed. Details of specifications of connection procedures are specified in the Wi-Fi Direct specification.

The base station searching unit 512 searches for a wireless communication device already functioning as a base station, when the wireless communication device 500 does not belong to a wireless network. Specifically, the base station searching unit 512 confirms whether there is a base station regularly sending out beacon signals around the wireless communication device 500. Alternatively, the base station searching unit 512 broadcasts probe request packets, and waits for a response from a base station. Then, the base station searching unit 512 analyzes the information included in the obtained beacon signal or probe response, and determines whether the beacon signal or probe response is sent out from a base station. The subsequent connection with a base station is performed by the base station connection unit 511 based on channels used for wireless communication and the SSID which is a network ID, which are set in the beacon signal or probe response according to the IEEE 802.11 specification. Specifications of the beacon signal, the probe request, and the probe response, are defined as the IEEE 802.11 specification.

When the base station is transferred by the base station transfer unit 530, the base station switching unit 513 performs a process of switching from a base station to which the wireless communication device 500 has been connected to a new base station. Necessary information is reported from the base station before the connection is switched. Details are given below.

The base station function implementing unit 520 includes a base station search response unit 521, a key management unit 522, an address distribution unit 523, a client list holding unit 524, and a beacon transmitting unit 525. The base station function implementing unit 520 provides functions of a base station of a wireless network for performing communications between plural wireless communication devices.

When a probe request sent from the base station searching unit 512 of another wireless communication device is received, the base station search response unit 521 returns a probe response including information relevant to channels and an SSID. Accordingly, another wireless communication device can connect to the wireless communication device providing functions of a base station.

The key management unit 522 stores keys for encrypting communications established between the wireless communication devices that are clients. The keys include encryption keys used for encrypting wireless communications with clients, such as WPA (Wi-Fi Protected Access) and WPA2.

The address distribution unit 523 distributes IP addresses to clients in the wireless network. Generally, IP addresses of a range set in advance are dynamically assigned to clients in accordance with DHCP (Dynamic Host Configuration Protocol).

The client list holding unit 524 holds a list of IP addresses and MAC address of clients present in the wireless network.

The beacon transmitting unit 525 periodically sends out beacon signals including information relevant to channels and SSID. Generally, a beacon is sent out every 100 milliseconds.

The base station transfer unit 530 includes a transfer signal sending unit 531, a transfer signal receiving unit 532, a client list sending unit 533, a client list receiving unit 534, a client IP address distribution possibility report unit 535, a client connection confirmation unit 536, a transfer determination unit 537, a key transmission unit 538, a key reception unit 539, and a base station switch timing report unit 540. The base station transfer unit 530 transfers functions of a base station from a wireless communication device functioning as a base station of an existing network connection to a wireless communication device that is newly joining the network.

Figure 6:
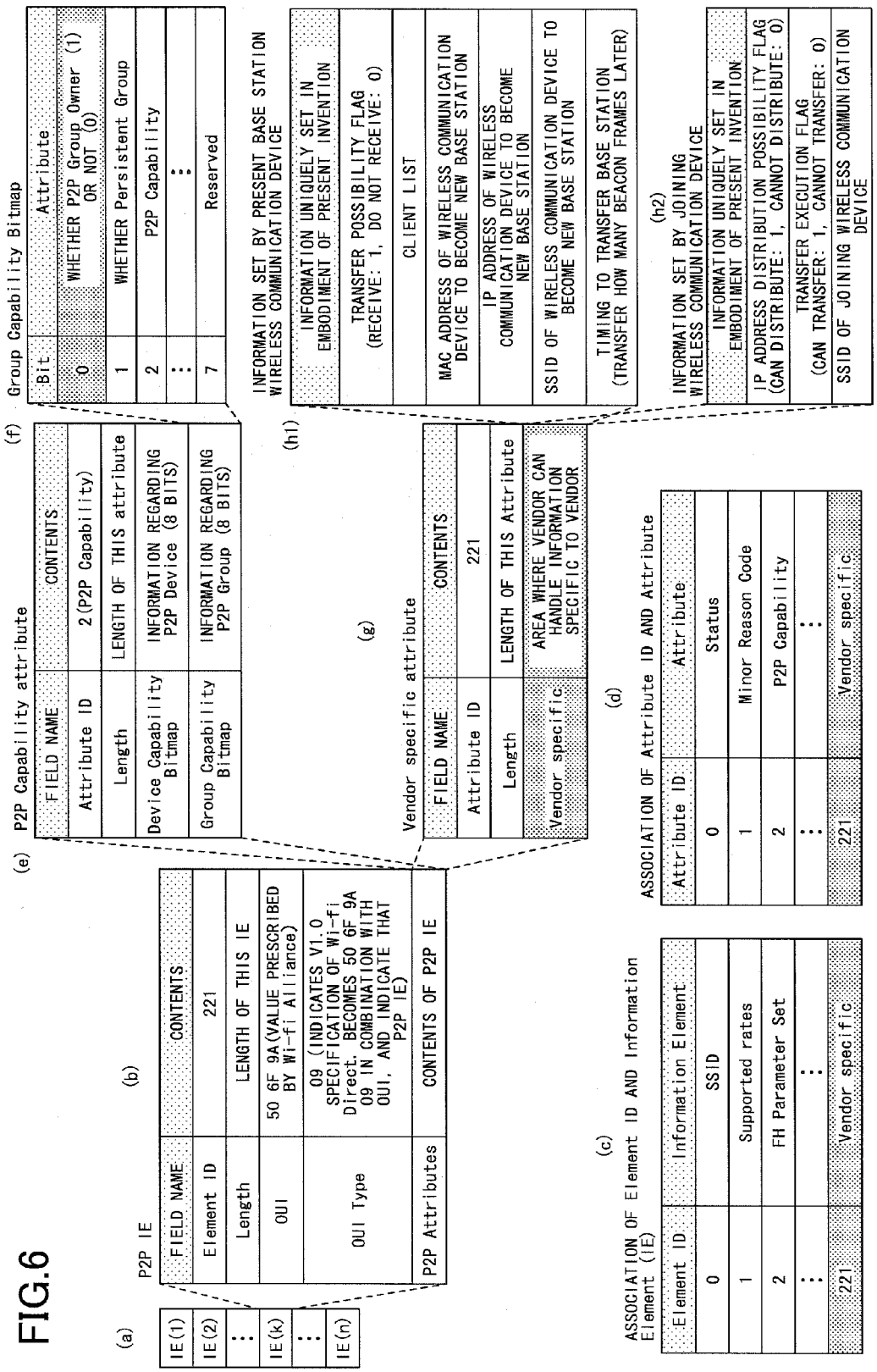
FIG. 6 illustrates an example of a frame format used by the wireless communication device according to an embodiment of the present invention.

The transfer signal sending unit 531 sends out signals for indicating that functions of a base station can be transferred, from a wireless communication device already functioning as a base station (hereinafter, "present base station wireless communication device") to another wireless communication device. Specifically, the signals are flags that are stored at predetermined positions in a frame prescribed by IEEE 802.11 as illustrated in FIG. 6. Details of the configuration of flags in a frame are described below. The frame including the flag is sent out by the beacon transmitting unit 525 together with a beacon.

The transfer signal receiving unit 532 provides functions for a wireless communication device newly joining the network (hereinafter, "joining wireless communication device") to receive signals sent by the transfer signal sending unit 531 of the present base station wireless communication device. By receiving a frame including the flag, the joining wireless communication device can detect that the present base station wireless communication device has a function for transferring the functions of a base station.

The client list sending unit 533 can make a present base station wireless communication device send a list of clients held by the client list holding unit 524, as part of elements constituting the beacon frame, similar to the flag described above.

The client list receiving unit 534 provides a function for the joining wireless communication device to receive a list sent from the client list sending unit 533 of the present base station wireless communication device. The joining wireless communication device detects, from the list, the IP addresses and MAC addresses of clients belonging to an existing network.

The client IP address distribution possibility report unit 535 makes the joining wireless communication device report, to the present base station wireless communication device, whether an IP address of a client can be distributed by the address distribution unit 523 when the wireless communication device 500 becomes a base station, based on information in the client list received by the client list receiving unit 534. When the IP address of a client can be distributed, it is possible to transfer the functions of a base station without disrupting an existing network connection.

The client connection confirmation unit 536 is for making the joining wireless communication device temporarily connect, as a client, to a present base station wireless communication device constituting an existing network, and confirm whether physical connection can be made with an existing client based on information of the client list. Accordingly, for example, by sending an ARP (Address Resolution Protocol) request to all clients based on IP addresses of clients listed in the client list, and receiving responses from the clients, it is possible to confirm whether physical connection can be made with all clients. If it is confirmed that connection can be made with all clients, problems such as not being able to connect with a joining wireless communication device after the base station function is transferred will not arise.

The transfer determination unit 537 makes the joining wireless communication device determine whether to receive transfer of functions of a base station from the present base station wireless communication device, based on results of a process performed by the transfer signal receiving unit 532, the negotiation unit 501, and the client connection confirmation unit 536. Specific examples of not receiving the transfer are when there is no flag indicating that the present base station wireless communication device is able to transfer the base station functions, when the base station index of the joining wireless communication device is lower than the base station index of the present base station wireless communication device, and when the joining wireless communication device cannot communicate with any one of the existing clients. Details are given below.

The key transmission unit 538 is for making the present base station wireless communication device transmit, to a joining wireless communication device that is to become a new base station, a key for encrypting communications with clients belonging to the existing network, which is held in the key management unit 522.

The key reception unit 539 makes the joining wireless communication device that is to become a new base station receive a key sent by the key transmission unit 538 of the present base station wireless communication device. When the joining wireless communication device that is to become a new base station functions as a base station, the joining wireless communication device can continue the communication with clients belonging to the existing network, by using the key.

The base station switch timing report unit 540 makes the present base station wireless communication device report the timing of transferring the functions of a base station to clients belonging to an existing network and a joining wireless communication device that is to become the new base station. For example, the report is given by beacon signals. For example, the timing is specified by informing to execute the transfer in a certain number of beacon signals later. At the same time, the IP address, the MAC address, and the SSID of a joining wireless communication device to become a new base station are reported. The client that has received this signal switches the connection to another base station at the specified timing, by the base station switching unit 513.

According to the above functions of the wireless communication device 500, the functions of a base station of an existing wireless network can be transferred from one of a plurality of wireless communication devices constituting the wireless network, to a wireless communication device which has a higher base station index than the others and which is to newly join the wireless network, without interrupting the communications of wireless communication devices other than the existing base station.

The client list transmitted by the client list sending unit 533 may not be included in the beacon frame, and may be transmitted in response to a request from a joining wireless communication device, for example. Accordingly, the information amount of the beacon frame can be reduced.

Furthermore, the client connection confirmation unit 536 may use the IP addresses and MAC addresses in clients included in the client list to confirm connection by another tool or method including PING, instead of ARP.

Description of Frame Format

FIG. 6 illustrates an example of a frame format used by the wireless communication device 500 according to an embodiment of the present invention.

A frame used by the wireless communication device 500 such as a beacon frame and a probe request/response frame complies with the formats defined in the IEEE 802.11 specification and the Wi-Fi Direct specification. The unique information used in an embodiment of the present invention is set in a vendor specific attribute area which can be uniquely set by a vendor. In the following, detailed descriptions are given of the structure of a frame.

As indicated in FIG. 6(a), in IEEE 802.11, a frame that is sent out with a purpose is constituted by combinations of information elements. An information element is a combination of an element ID indicating the type of information and other fields. FIG. 6(b) expresses the structure of a P2P information element prescribed in the Wi-Fi Direct specification. Hereinafter, a description is given of the structure of a P2P information element.

As fields of a P2P information element, an element ID, the length of the information element, an OUI (Organizationally Unique Identifier), an OUI type, and P2P Attributes are defined. As an element ID, among the values indicated in FIG. 6(c), the specifics of 221 (vendor specific) are defined in the Wi-Fi Direct specification. Regarding the length of the information element, information for identifying the length of the information element is stored. As the OUI and the OUI type, a unique value of a total of four bytes is set, which is defined by the Wi-Fi Direct specification. By this value, the information element is identified as a P2P information element. Lastly, in the P2P attributes, the contents of the P2P information element are stored.

As the P2P attributes, the types of attributes indicated in FIG. 6(d) are defined, and formats are defined for storing the information for each attribute. FIG. 6(e) and FIG. 6(f) indicate formats of P2P capability attributes. For example, when the attribute ID of the P2P information element included in a certain frame is 2, and the bit 0 of the group capability bitmap is 1, it is known that the information element is sent out from the group owner (base station).

The wireless communication device according to an embodiment of the present invention transfers the functions of a base station by using the vendor specific attribute area (attribute ID=221) of the P2P information element indicated in FIG. 6(g), defining a unique structure indicated in FIGS. 6(h1) and (h2), and performing a process according to the flowchart of FIGS. 7A through 8 described below.

In FIG. 6(g), there is an attribute ID field, a length field, and a vendor specific field. In the attribute ID field, 221 indicating a vendor specific attribute is stored. In the length field, the length of the attribute information, including the following attribute information is stored. In the vendor specific field, information prescribed in FIGS. 6(h1) and (h2) is stored.

FIG. 6(h1) indicates an example of attributes included in a frame transmitted by the present base station wireless communication device, including a transfer possibility flag, a client list, the MAC address of a wireless communication device to function as a new base station, the IP address of a wireless communication device to function as a new base station, and timing information indicating the timing to transfer the base station.

The transfer possibility flag is sent by the transfer signal sending unit 531, which indicates 1 when the base station function can be transferred, and indicates 0 when the when the base station function cannot be transferred.

The client list is a list sent by the client list sending unit 533, and includes the IP addresses and MAC address of all clients connected to the existing network.

The MAC address of the wireless communication device functioning as a new base station is sent by the base station switch timing report unit 540 when the functions of the base station are transferred, and is used when an existing client connects to a new base station.

The IP address of the wireless communication device functioning as a new base station is sent by the base station switch timing report unit 540 when the functions of the base station are transferred, and is used when an existing client connects to a new base station.

The timing information indicating the timing to transfer the base station is sent by the base station switch timing report unit 540 when the functions of the base station are transferred, and is used for determining the timing to start the operation of the new base station. For example, the timing is specified by informing to execute the transfer in a certain number of beacon signals later.

FIG. 6(*h2*) indicates an example of attributes included in the frame sent by the joining wireless communication device, such as an IP address including flag, a transfer flag, and the SSID of the joining wireless communication device.

The IP address distribution possibility flag is sent by the client IP address distribution possibility report unit 535, and indicates whether the joining wireless communication device can distribute IP addresses held by all clients belonging to the existing network. Specifically, 1 is indicated when distribution is possible, and 0 is indicated when distribution is not possible.

The transfer flag is sent when it is determined that the transfer is to be executed as a result of the determination of the transfer determination unit 537, and 1 is indicated when the transfer is to be executed, and 0 is indicated when the transfer is not to be executed.

The SSID of the joining wireless communication device is defined in advance in the joining wireless communication device, and when the joining wireless communication device functions as a new base station, the SSID is used by wireless communication devices other than the base station to connect to the base station.

As described above, communication is performed by setting information necessary for the vendor specific attributes in the P2P information element based on the IEEE 802.11 specification and the Wi-Fi Direct specification. Therefore, functions of a base station can be transferred to a wireless communication device that is more appropriate as a base station than the present base station without interrupting the communications of wireless communication devices connected to the existing network.

Description of Flow

Figure 7A:
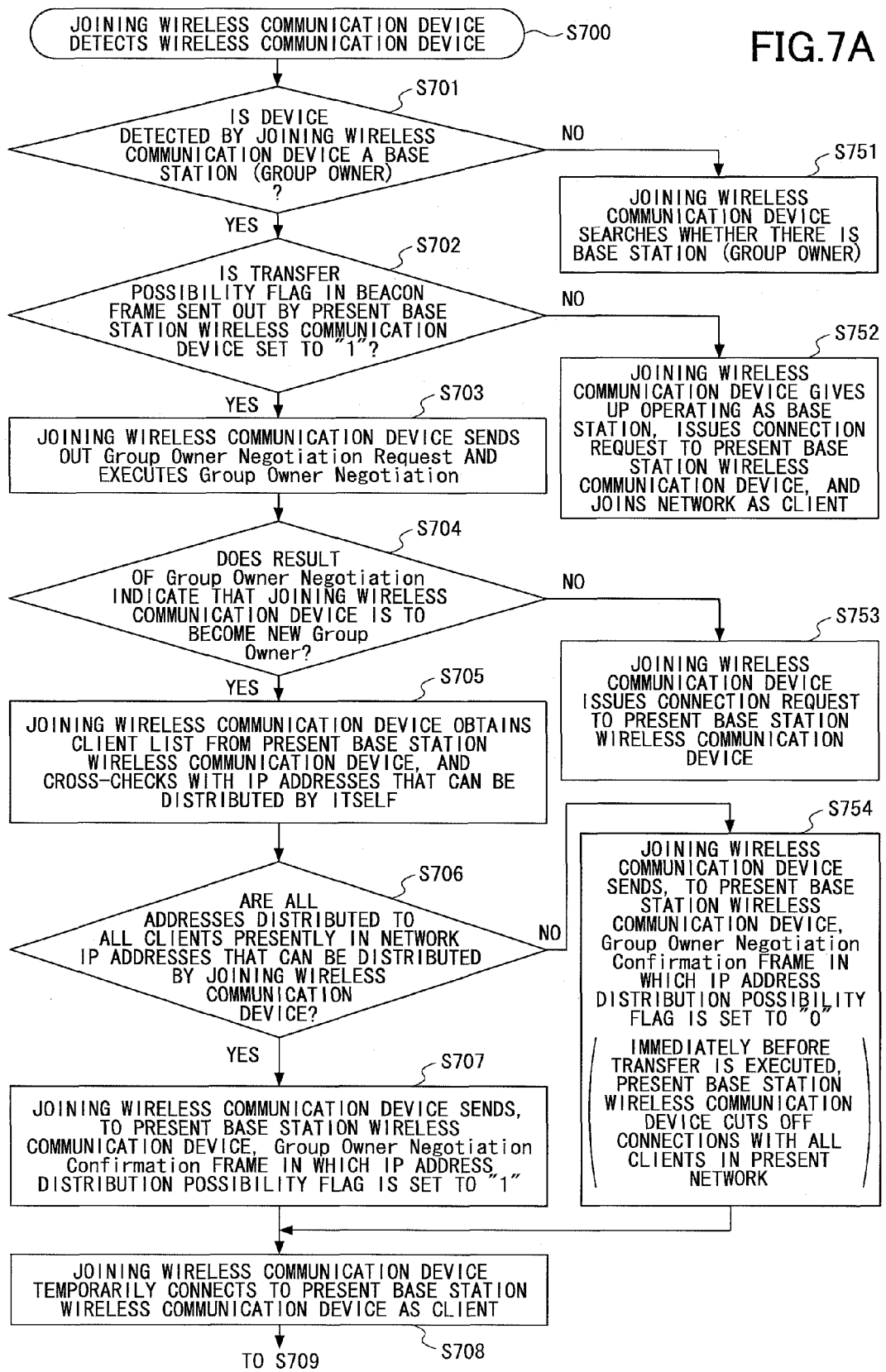
FIGS. 7A and 7B indicate a flowchart of operations of the wireless communication device according to an embodiment of the present invention.
Figure 7B:
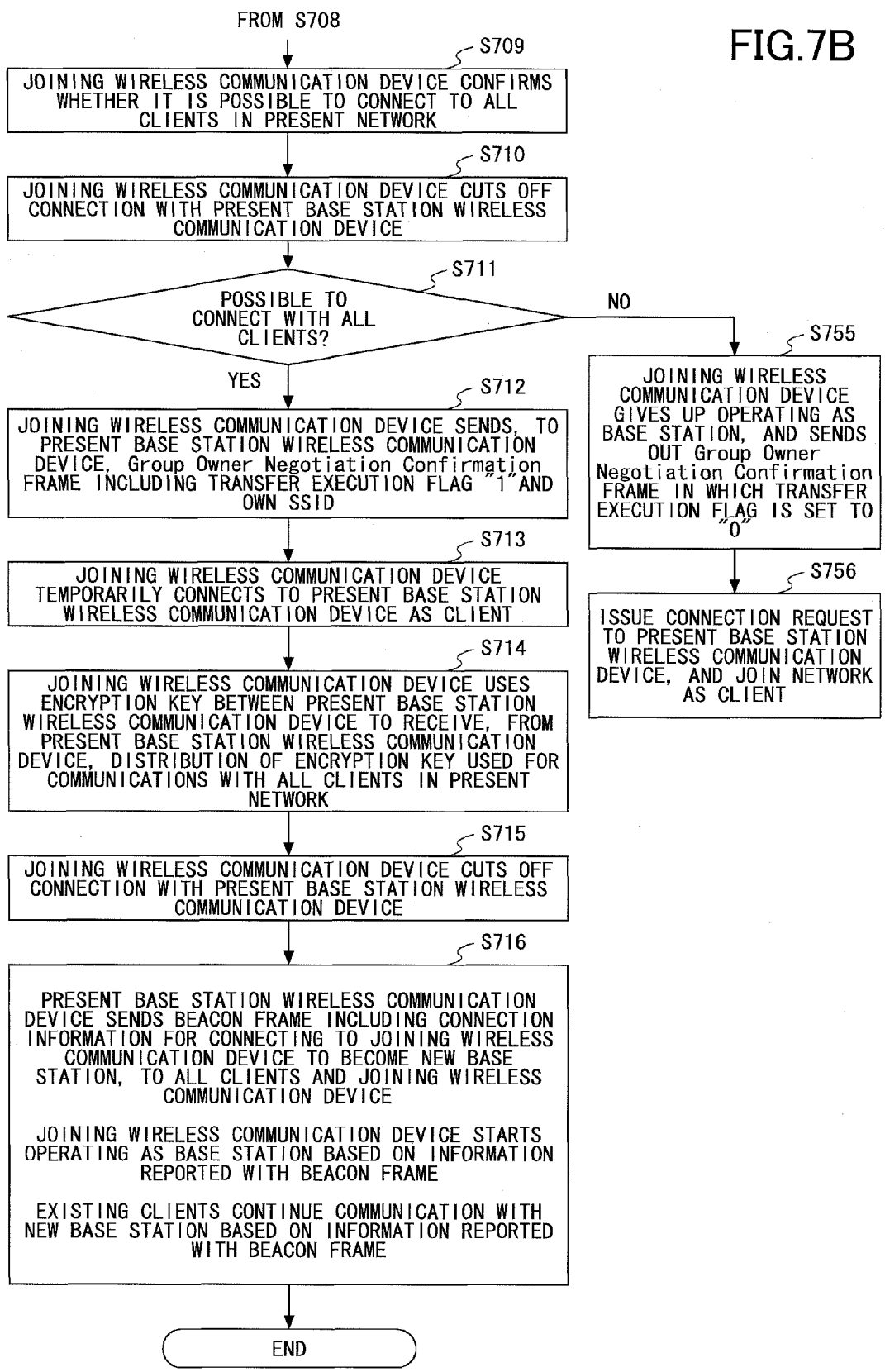

Next, with reference to FIGS. 7A through 8, a description is given of procedures for transferring the base station functions of the wireless communication device according to an embodiment of the present embodiment with the configuration indicated in FIG. 3. FIGS. 7A and 7B indicate a flowchart of operations of the wireless communication device according to an embodiment of the present invention. FIG. 8 is a sequence diagram indicating the flow of operations.

In step S700, a joining wireless communication device that is to newly join an existing network uses the base station searching unit 512 to receive beacon signals or to receive probe responses by broadcasting probe requests, and detects a base station. Meanwhile, the present base station wireless communication device uses the beacon transmitting unit 525 or the base station search response unit 521 to transmit beacon signals or a probe response. FIG. 8 indicates an example where a probe request is transmitted instead of beacon signals (FIG. 8 (1)), and a response to this request is received from the base station (FIG. 8 (2)).

In step S701, the joining wireless communication device checks whether the detected base station is a wireless communication device functioning as a base station based on the Wi-Fi Direct specification. When the received frame includes a P2P information element, it is possible to check the above by referring to the information stored in the Bit 0 of the Group Capability Bitmap (see FIG. 6(*f*)). When the value of the Bit 0 of the Group Capability Bitmap is "1", the process proceeds to step s702, and when the value of the Bit 0 of the Group Capability Bitmap is "0", the process proceeds to step S751.

When the value of the Bit 0 of the Group Capability Bitmap is "0", in step S751, the joining wireless communication device determines that the detected wireless communication device is not a wireless communication device functioning as a base station, and searches whether there is a wireless communication device functioning as a base station.

In step S702, the joining wireless communication device checks the value of the transfer possibility flag included in the beacon frame (FIG. 8 (3)) sent by the present base station wireless communication device (present group owner) and received by the transfer signal receiving unit 532. As indicated in FIG. 6(*h1*), the transfer possibility flag is information uniquely set in the vendor specific attribute area in an embodiment of the present invention. The wireless communication device operating as a base station uses the base station search response unit 521 or the beacon transmitting unit 525 to set this information in the P2P information element in the beacon frame or the probe response frame. When the transfer possibility flag is "1", the process proceeds to step S703, and when the transfer possibility flag is "0", the process proceeds to step S752.

In step S752, based on the above results, the transfer determination unit 537 of the joining wireless communication device determines that it is not possible to receive the transfer of the base station. Subsequently, the base station connection unit 511 of the joining wireless communication device issues a connection request to the present base station wireless communication device to join this group as a client.

In step S703, the joining wireless communication device to newly join the network uses the negotiation unit 501 and the base station indices managed by the base station index management unit 505, and sends a group owner negotiation request to the present base station wireless communication device (FIG. 8 (4)). Then, similar to the method illustrated in FIG. 1, the joining wireless communication device receives the group owner negotiation response including the base station index of the present base station wireless communication device, from the present base station wireless communication device (FIG. 8 (5)).

In step S704, when the obtained base station index of the present base station wireless communication device is less than the base station index of the joining wireless communication device, the process proceeds to step S705, and when the obtained base station index of the present base station wireless communication device is greater than the base station index of the joining wireless communication device, the process proceeds to step S753. When the base station indices of the present base station wireless communication device and the joining wireless communication device are the same, for example, when the joining wireless communication device is determined to be the base station as a result of a method prescribed in, for example, the Wi-Fi Direct specification, the process proceeds to step S705, and otherwise, the process proceeds to step S753.

In step S753, based on the above results, the transfer determination unit 537 of the joining wireless communication device determines that it is not possible to receive the transfer of the base station. Subsequently, the base station connection unit 511 of the joining wireless communication device issues a connection request to the present base station wireless communication device to join this group as a client.

In step S705, the joining wireless communication device refers to a client list including the IP addresses and MAC addresses of the clients belonging to the existing network, which is received by the client list receiving unit 534. The client list is stored in the vendor specific area of the P2P information element in the beacon frame and is transmitted by the client list sending unit 533 of the present base station wireless communication device.

In step S706, the joining wireless communication device verifies whether all IP addresses listed in the client list are included in the IP addresses that can be distributed by the address distribution unit 523 of the joining wireless communication device itself. As a result, when all IP addresses can be distributed, the process proceeds to step S707, and when all IP addresses cannot be distributed, the process proceeds to step S754.

In step S754, the client IP address distribution possibility report unit 535 of the joining wireless communication device sends, to the present base station wireless communication device, a Group Owner Negotiation Confirmation frame including the P2P information element in which the IP address distribution possibility flag is set to "0". The present base station wireless communication device that has received the IP address distribution possibility flag cuts off connections with all clients when subsequently executing the transfer of functions of the base station, in order to update the IP addresses of existing clients. This process of cutting off the connections is performed immediately before transferring the base station as described below. Next, the process proceeds to step S708.

In step S707, the client IP address distribution possibility report unit 535 of the joining wireless communication device sends, to the present base station wireless communication device, a Group Owner Negotiation Confirmation frame including the P2P information element in which the IP address distribution possibility flag is set to "1" (FIG. 8 (6)).

In step S708, the joining wireless communication device uses the base station connection unit 511 to temporarily connect to the present base station wireless communication device as a client (FIG. 8 (7)).

In step S709, the joining wireless communication device uses the client connection confirmation unit 536 to confirm whether the joining wireless communication device can physically communicate with all clients in the existing network (FIG. 8 (8)).

In step S710, the joining wireless communication device cuts off the connection with the present base station wireless communication device (FIG. 8 (9)).

In step S711, when the client connection confirmation unit 536 of the joining wireless communication device confirms that communication can be performed with all clients, the process proceeds to step S712. When communication cannot be performed with all clients, the process proceeds to step S755.

In step S755, the transfer determination unit 537 of the joining wireless communication device determines that the joining wireless communication device cannot receive the transfer of the base station.

In step S755, the transfer determination unit 537 of the joining wireless communication device determines that is not possible to receive the transfer of the base station. The joining wireless communication device once again sends, to the present base station wireless communication device, a Group Owner Negotiation Confirmation frame including the P2P information element in which a transfer execution flag is set to "0".

Next, in step S756, the base station connection unit 511 of the joining wireless communication device issues a connection request to the present base station wireless communication device to join this group as a client.

In step S712, the joining wireless communication device sets the transfer execution flag to "1", and once again sends, to the present base station wireless communication device, a Group Owner Negotiation Confirmation frame including the P2P information element in which the SSID of the joining wireless communication device itself is set (FIG. 8 (10)).

In step S713, the joining wireless communication device uses the base station connection unit 511 to once again connect to the present base station wireless communication device as a client (FIG. 8 (11)).

In step S714, the joining wireless communication device receives the encryption key used for communicating with all clients connected to the existing network, by the key reception unit 539 (FIG. 8 (12)). This key is sent by the key transmission unit 538 of the present base station wireless communication device.

In step S715, the joining wireless communication device cuts off the connection with the present base station wireless communication device (FIG. 8 (13)).

In step S716, the present base station wireless communication device sends, to all clients and the joining wireless communication device, a beacon frame including the MAC address, the IP address, and the SSID of the joining wireless communication device to become the new base station and a P2P information element in which the information of the timing of transferring the base station to the joining wireless communication device is set (FIG. 8 (14)). Subsequently, after transferring the base station, connections with all clients are cut off (FIG. 8 (16)), and the present base station wireless communication device connects with the new base station (FIG. 8 (17)).

Similarly, in step S716, the joining wireless communication device starts operating as a base station, based on information of the timing to transfer the base station reported by the beacon frame (FIG. 8 (15)). At this time, in the communications with clients, the key acquired at step S712 is used. When the process has proceeded through step S754, the address distribution unit 523 of the joining wireless communication device once again distributes the IP address to the clients.

Similarly, in step S716, the existing clients continue communication with the new base station at the timing of the transfer, based on the MAC address, the IP address, and the SSID of the joining wireless communication device that is to become the new base station, which are reported by the beacon frame (FIG. 8 (18)).

By the above method, functions of the base station in an existing wireless network can be transferred to a wireless communication device having a greater base station index, without having the present base station wireless communication device stop functioning as a base station, i.e., without cutting communications with all clients that are already connected. As a result, it is possible to prevent the processing amount from exceeding the allowable amount, which occurs when a wireless communication device that is preferably not operating as a base station is performing processing as a base station.

Furthermore, the IP addresses that can be distributed by the present base station wireless communication device and the joining wireless communication device are cross-checked, and it is checked wither the IP addresses being allocated by the present base station wireless communication device are within the range of IP addresses that can be distributed by the joining wireless communication device. Based on the above results, the functions of the base station are transferred. Therefore, it is possible to prevent failures in data communications that arise when the subnet mask does not match the IP addresses that the new base station can distribute.

Furthermore, by simultaneously reporting the timing of transferring the base station by a beacon frame, it is possible to minimize interruptions in communications between wireless communication devices. Furthermore, the base station is switched by a simple process which is executed in several frames after the beacon frame, and therefore the process load on the clients is reduced.

The P2P information element including the vendor specific attributes used in the present embodiment may be transmitted and received in frames other than the frames exemplified above. The information elements that are exemplified as being included in the beacon frame, such as the transfer possibility flag, the client list, the MAC address, the IP address, and the SSID of the wireless communication device to become the new base station, and the timing of transferring the base station, may be appropriately transferred by other frames defined in IEEE 802.11 or the Wi-Fi Direct specification. Accordingly, the information amount in the beacon frame can be reduced, and the respective processes can be started without waiting for the arrival of the beacon frame.

Furthermore, the P2P information element including the vendor specific attributes used in the present embodiment may not be received in the exemplified order. For example, the transfer possibility flag and the client list included in the beacon frame received at step S702 may be included in the probe response received at step S701. Accordingly, negotiation can be started without waiting for the arrival of the beacon.

Furthermore, the transfer possibility flag sent out by the wireless communication device that is the base station may be constantly transmitted as "0", when the base station index of this wireless communication device is the maximum value "15". Accordingly, unnecessary negotiation processes can be reduced.

Furthermore, in step S704, the transfer process may not be performed when the base station index of the present base station wireless communication device is equal to the base station index of the joining wireless communication device. Accordingly, unnecessary negotiation processes can be reduced when there is hardly any effect in transferring the base station.

According to an aspect of the present invention, a wireless communication device is provided, with which functions of a base station of an existing wireless network can be transferred to a wireless communication device that is more appropriate as a base station, without cutting off communications of wireless communication devices other than the existing base station belonging to the wireless network.

The wireless communication device and the wireless communication method are not limited to the specific embodiments described herein, and variations and modifications may be made without departing from the scope of the present invention.

The present invention can be implemented in any convenient form, for example using dedicated hardware, or a mixture of dedicated hardware and software. The present invention may be implemented as computer software implemented by one or more networked processing apparatuses. The network can include any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on Japanese Priority Patent Application No. 2011-175416, filed on Aug. 10, 2011, the entire contents of which are hereby incorporated herein by reference.

What is claimed is:

1. A first wireless communication device of a plurality of wireless communication devices constituting a wireless network, the wireless network is for performing communications between the plurality of wireless communication devices in the wireless network, the first wireless communication device having a base station index based on which the first wireless communication device functions as a base station of the wireless network, the base station index expressing a degree to which a wireless communication device of the plurality of wireless communication devices functions as the base station, the first wireless communication device comprising:

a base station transfer unit configured to perform a transfer process of transferring a function of the base station of the wireless network from the first wireless communication device functioning as the base station of the wireless network already formed to a second wireless communication device that is newly joining the wireless network, and the base station transfer unit is configured to perform the transfer process when a base station index of the second wireless communication device is higher than the base station index of the first wireless communication device;
a transfer flag transmitting/receiving unit configured to,
transmit a flag expressing whether the function of the base station can be transferred when the first wireless communication device is functioning as the base station of the wireless network already formed, and a list of IP address of a third wireless communication device of the plurality of wireless communication devices, and
receive the flag and the list of IP addresses of the third wireless communication device when the third wireless communication device is newly joining the wireless network; and
a transfer determining unit configured to determine whether to transfer the function of the base station based on contents of the flag and the list of IP addresses of the third wireless communication device, and
the base station transfer unit is configured to perform the transfer process based on whether the transfer determining unit determines to transfer the function of the base station.

2. The wireless communication device according to claim 1, wherein the flag is included in a beacon signal transmitted by the first wireless communication device.

3. The wireless communication device according to claim 2, wherein the beacon signal includes the list of IP addresses of the third wireless communication device, and the transfer determining unit is configured to:
determine to transfer the function of the base station from the first wireless communication device to the second wireless communication device, when the second wireless communication device can distribute the IP address of the third wireless communication device.

4. The wireless communication device according to claim 3, further comprising:
a response request transmitting unit configured to transmit a packet requesting a response to the third wireless communication device listed in the list, wherein
the transfer determining unit is configured to determine to transfer the function of the base station from the first wireless communication device to the second wireless communication device, when the response is obtained.

5. The wireless communication device according to claim 1, wherein the first wireless communication device is configured to:
manage a key for performing communications between the first wireless communication device and the third wireless communication device, and
the base station transfer unit is configured to transmit the key from the first wireless communication device to the second wireless communication device when transferring the function of the base station.

6. The wireless communication device according to claim 1, wherein the base station transfer unit is configured to:
report a timing of transferring the function of the base station from the first wireless communication device to the second wireless communication device when transferring the function of the base station.

7. A non-transitory computer-readable recording medium storing a wireless communication program in a first wireless communication device, the first wireless communication device being one of a plurality of wireless communication devices constituting a wireless network, the wireless network is for performing communications between the plurality of wireless communication devices in the wireless network, the first wireless communication device having a base station index based on which the first wireless communication device functions as a base station of the wireless network, the base station index expressing a degree to which a wireless communication device of the plurality of wireless communication devices functions as the base station, wherein the wireless communication program, when executed by the first wireless communication device, configures the first wireless communication device to:
perform a transfer process of transferring a function of the base station of the wireless network from a first wireless communication device functioning as the base station of the wireless network already formed to a second wireless communication device that is newly joining the wireless network, when the base station index of the second wireless communication device is higher than that of the first wireless communication device;
transmit a flag expressing whether the function of the base station can be transferred when the first wireless communication device is functioning as the base station of the wireless network already formed, and a list of IP address of a third wireless communication device of the plurality of wireless communication devices;
receive the flag and the list of IP addresses of the third wireless communication device when the third wireless communication device is newly joining the wireless network; and
determine whether to transfer the function of the base station based on contents of the flag and the list of IP addresses of the third wireless communication device, and
the transfer process is performed based on a result of the determining.

8. A wireless communication method executed by a first wireless communication device of a plurality of wireless communication devices constituting a wireless network, the wireless network is for performing communications between the plurality of wireless communication devices in the wireless network, the first wireless communication device having a base station index, the base station index expressing a degree to which a wireless communication device of the plurality of wireless communication devices functions as the base station in the wireless network, the wireless communication method comprising:
performing a transfer process of transferring a function of the base station of the wireless network from a first wireless communication device functioning as the base station of the wireless network already formed to a second wireless communication device that is newly joining the wireless network, when the base station index of the second wireless communication device is higher than that of the first wireless communication device;
transmitting a flag expressing whether the function of the base station can be transferred when the first wireless communication device is functioning as the base station of the wireless network already formed, and a list of IP address of a third wireless communication device of the plurality of wireless communication devices;
receiving the flag and the list of IP addresses of the third wireless communication device when the third wireless communication device is newly joining the wireless network; and
determining whether to transfer the function of the base station based on contents of the flag and the list of IP addresses of the third wireless communication device, and the transfer process is performed based on a result of the determining.

\* \* \* \* \*